US012224851B2

(12) United States Patent
Li et al.

(10) Patent No.: US 12,224,851 B2
(45) Date of Patent: Feb. 11, 2025

(54) TIME SYNCHRONIZATION DEVICE, TIME SYNCHRONIZATION SYSTEM, AND RECORDING MEDIUM

(71) Applicant: Mitsubishi Electric Corporation, Tokyo (JP)

(72) Inventors: Lei Li, Tokyo (JP); Takashi Ichimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 119 days.

(21) Appl. No.: 17/924,116

(22) PCT Filed: Jul. 1, 2020

(86) PCT No.: PCT/JP2020/025827
§ 371 (c)(1),
(2) Date: Nov. 9, 2022

(87) PCT Pub. No.: WO2022/003865
PCT Pub. Date: Jan. 6, 2022

(65) Prior Publication Data
US 2023/0179312 A1 Jun. 8, 2023

(51) Int. Cl.
*H04J 3/06* (2006.01)
(52) U.S. Cl.
CPC .................. *H04J 3/0638* (2013.01)
(58) Field of Classification Search
CPC .................. H04J 3/0638; H04L 5/14
See application file for complete search history.

(56) References Cited

U.S. PATENT DOCUMENTS

| 8,849,937 B2* | 9/2014 | Park ............. H04J 3/0667 |
| | | 709/248 |
| 9,112,631 B2* | 8/2015 | Aweya ............ H04J 3/0664 |
| (Continued) | | |

FOREIGN PATENT DOCUMENTS

JP  2018-88646 A  6/2018

OTHER PUBLICATIONS

International Search Report and Written Opinion mailed on Sep. 24, 2020, received for PCT Application PCT/JP2020/025827, filed on Jul. 1, 2020, 9 pages including English Translation.

(Continued)

*Primary Examiner* — Bailor C Hsu
(74) *Attorney, Agent, or Firm* — XSENSUS LLP

(57) ABSTRACT

A first slave device (300) is connected between a master device (200) retaining a reference time and a second slave device (400) and executes time synchronization with the master device (200) in accordance with the PTP, together with the second slave device (400). A first synchronization information transmitter (332) transmits Sync and Follow_Up messages to the second slave device (400), a first request information receiver (313) receives a Delay_Req message from the second slave device (400), and a first response information transmitter (333) transmits a Delay_Resp message to the second slave device (400). A first time corrector (320) executes time correction based on a propagation delay time relative to the master device (200), calculated from times identified through transmission and reception of messages to and from the master device (200), during a period different from the period from transmission of the Sync message until reception of the Delay_Req message.

16 Claims, 10 Drawing Sheets

(56) References Cited

U.S. PATENT DOCUMENTS

| | | | |
|---|---|---|---|
| 10,244,475 B2* | 3/2019 | Lu | H04W 56/002 |
| 10,594,424 B2* | 3/2020 | Jeon | H04W 56/0055 |
| 11,197,075 B1* | 12/2021 | Kamen | H04L 43/0817 |
| 2011/0002251 A1 | 1/2011 | Shin et al. | |
| 2012/0153166 A1* | 6/2012 | Gueorguiev | H04J 3/0667 |
| | | | 250/362 |
| 2013/0170507 A1* | 7/2013 | Hsueh | H04L 63/04 |
| | | | 370/503 |
| 2016/0080533 A1* | 3/2016 | Jeon | H04L 12/66 |
| | | | 370/402 |
| 2018/0152286 A1* | 5/2018 | Kemparaj | H04L 7/041 |
| 2020/0382233 A1* | 12/2020 | Oe | H04J 3/0644 |
| 2022/0278872 A1* | 9/2022 | Schwamborn | H04L 47/2416 |
| 2022/0312358 A1* | 9/2022 | Oga | H04L 69/40 |

OTHER PUBLICATIONS

Reis et al., "Synchronization and Syntonization of Wireless Sensor Networks", 2013 IEEE Topical Conference on Wireless Sensors and Sensor Networks (WiSNet), Mar. 28, 2013, pp. 151-153.
Office Action dated Oct. 12, 2024, issued for corresponding Chinese Patent Application No. 202080102456.2 and a Partial English translation (10 pages).

* cited by examiner

TIME SYNCHRONIZATION DEVICE, TIME SYNCHRONIZATION SYSTEM, AND RECORDING MEDIUM

CROSS-REFERENCE TO RELATED APPLICATION

The present application is based on PCT filing PCT/JP2020/025827, filed Jul. 1, 2020, the entire contents of which are incorporated herein by reference.

TECHNICAL FIELD

The present disclosure relates to a time synchronization device, a time synchronization system, a time synchronization method, and a program.

BACKGROUND ART

Time synchronization systems for synchronizing the times of devices within a network are applied to various industries, such as financial industry, manufacturing industry, and telecommunication industry. As is generally known, such time synchronization systems use the precision time protocol (PTP) defined in Institute of Electrical and Electronics Engineers (IEEE) 1588. The PTP is a standard for a slave that receives a message from a grandmaster clock (GMC), that is, a so-called grandmaster to synchronize the time with the grandmaster. In accordance with the PTP, a device retaining a highly accurate time within a network serves as a grandmaster while devices other than the grandmaster serve as slaves. In the case of a large-scale network in accordance with the PTP, any of the slaves serves as a boundary clock (BC), which relays messages received from the grandmaster to another slave connected to the boundary clock.

As an exemplary time synchronization system using the PTP, Patent Literature 1 discloses a wireless communication system including a baseband unit provided in a radio base station, a packet transfer network including multiple switch devices, and a grandmaster to feed a reference time to the packet transfer network. In Patent Literature 1, the switch devices serve as boundary clocks, and the reference time is fed from the grandmaster via eight switch devices to the baseband unit. The technique disclosed in Patent Literature 1 involves calculating an allowable value of time error in the baseband unit, on the basis of a predetermined upper limit of time error relative to the reference time of the grandmaster, the number of switch devices disposed in the path from the grandmaster, and a time error in each of the switch devices in the path. Patent Literature 1 illustrates an exemplary case in which the switch devices in the path have the same time error of 50 ns.

CITATION LIST

Patent Literature

Patent Literature 1: Unexamined Japanese Patent Application Publication No. 2018-088646

SUMMARY OF INVENTION

Technical Problem

The wireless communication system disclosed in Patent Literature 1 includes the switch devices of the identical type assumed to have the same accuracy of time synchronization. In contrast, a time synchronization system using the Internet, for example, may include switch devices belonging to different owners, made by different manufacturers, and having different specifications, and therefore providing different accuracies of time synchronization. Multiple types of switch devices providing different accuracies of time synchronization are likely to have timings of time synchronization that were determined independently from each other. If the timings of time synchronization are determined for the switch devices independently from each other, the corrected time after time correction at a switch device or the baseband unit may still have a significant error relative to the reference time. In an exemplary case where a second switch device executes time correction through transmission and reception of messages between a first switch device and the second switch device and the timings of time synchronization are determined for these switch devices independently from each other, the first switch device may execute time correction while the second switch device is transmitting and receiving messages to and from the first switch device. In this case, the messages received at the second switch device may contain both of a piece of information on the uncorrected time of the first switch device and a piece of information on the corrected time. The time correction based on these pieces of information at the second switch device unfortunately result in a corrected time having a significant error relative to the reference time.

An objective of the present disclosure, which has been accomplished in view of the above-described situation, is to reduce the time error.

Solution to Problem

In order to achieve the above objective, a time synchronization device according to an aspect of the present disclosure is connectable to a time retaining device retaining a time to execute time synchronization with the time retaining device in accordance with the precision time protocol (PTP) of Institute of Electrical and Electronics Engineers (IEEE) 1588 standard, together with another time synchronization device not connected to the time retaining device. The time synchronization device includes a synchronization information transmitter, a request information receiver, a response information transmitter, and a time corrector. The synchronization information transmitter transmits synchronization information on time synchronization to the other time synchronization device. The request information receiver receives request information, which is transmitted from the other time synchronization device after transmission of the synchronization information from the synchronization information transmitter. The response information transmitter transmits, to the other time synchronization device, response information responding to the request information received by the request information receiver. The time corrector executes time correction on the basis of a propagation delay time relative to the time retaining device during a period different from a period from transmission of the synchronization information from the synchronization information transmitter until reception of the request information by the request information receiver. The propagation delay time is calculated from times identified through transmission and reception of information to and from the time retaining device.

Advantageous Effects of Invention

The time synchronization device according to an aspect of the present disclosure does not execute time correction during the period from transmission of the synchronization information to the other time synchronization device until reception of the request information from the other time synchronization device. This configuration can prevent an error from occurring in the propagation delay time calculated at the other time synchronization device during this period, even if timings of time synchronization are determined for the time synchronization device and the other time synchronization device independently from each other. The time synchronization device can therefore reduce a time error at the other time synchronization device, in comparison to a time synchronization device that executes time correction during the period from transmission of synchronization information to the other time synchronization device until reception of request information from the other time synchronization device.

DESCRIPTION OF EMBODIMENTS

Figure 1:
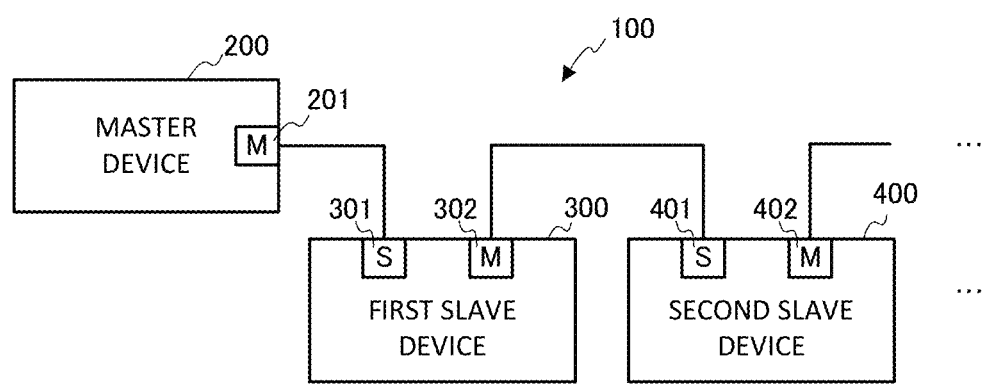
FIG. 1 is an explanatory diagram illustrating an entire time synchronization system according to an embodiment of the present disclosure.

A time synchronization device, a time synchronization system, a time synchronization method, and a program according to an embodiment of the present disclosure are described in detail below with reference to the accompanying drawings. In these drawings, the components identical or corresponding to each other are provided with the same reference symbol.

A time synchronization system according to an embodiment of the present disclosure is a system to synchronize the time of a slave device, which is an example of a time synchronization device, connected to a master device, which is an example of a time retaining device, with the time of the master device in accordance with the PTP. In such a time synchronization system for time synchronization in accordance with the PTP, the master device and the slave device transmit and receive messages, which are examples of time information, to and from each other, and the slave device then calculates a propagation delay time of messages against the master device and executes time correction.

Specifically, the master device first transmits a Sync message and a Follow_Up message, which are examples of synchronization information on time synchronization, in this order to the slave device. The Follow_Up message contains information from which a first time T1 indicating the time of transmission of the Sync message can be identified. The slave device then receives the Sync message and identifies a second time T2 indicating the time of reception of the Sync message, and receives the Follow_Up message and identifies the first time T1 therefrom. The slave device then transmits, to the master device, a Delay_Req message (Delay Request message), which is an example of request information based on the synchronization information, for requesting information to be used in calculation of a propagation delay time, and identifies a third time T3 indicating the time of transmission of the Delay_Req message. The master device then receives the Delay_Req message and identifies a fourth time T4 indicating the time of reception of the Delay_Req message, and then transmits, to the slave device, a Delay_Resp message (Delay Response message), which is an example of response information responding to the request information. The Delay_Resp message contains information from which the fourth time T4 indicating the time of reception of the Delay_Req message can be identified. The slave device then receives the Delay_Resp message and identifies the fourth time T4 therefrom. The slave device then calculates a propagation delay time from the identified first time T1, second time T2, third time T3, and fourth time T4 and executes time correction. Assuming that d indicates the propagation delay time and tc indicates a time correction value, the propagation delay time d is calculated using the following Expression (1) and the time correction value tc is calculated using the following Expression (2).

$$d=\{(T4-T1)-(T3-T2)\}/2 \tag{1}$$

$$tc=T1+d \tag{2}$$

Also in the time synchronization system according to the embodiment described below, the master device and the slave device transmit and receive messages to and from each other, and the slave device then calculates a propagation delay time of messages against the master device and executes time correction.

FIG. 1 is an explanatory diagram illustrating an entire time synchronization system according to the embodiment of the present disclosure.

As illustrated in FIG. 1, a time synchronization system 100 according to this embodiment includes a master device 200, which is an example of a time retaining device. The time synchronization system 100 also includes a first slave device 300, which is an example of a time synchronization device and an example of a first time synchronization device, connected to the master device 200. The time synchronization system 100 further includes a second slave device 400, which is an example of another time synchronization device and an example of a second time synchronization device, connected to the first slave device 300 without being connected to the master device 200.

The master device 200, the first slave device 300, and the second slave device 400 can transmit and receive information to and from each other via a local area network (LAN). Specifically, the master device 200 has a master port 201, the first slave device 300 has a slave port 301 and a master port 302, and the second slave device 400 has a slave port 401 and a master port 402. The master port 201 of the master device 200 is connected to the slave port 301 of the first slave device 300 via the LAN, so that the master device 200 can transmit and receive information on time synchronization to and from the first slave device 300. The master port 302 of the first slave device 300 is connected to the slave port 401 of the second slave device 400 via the LAN, so that the first slave device 300 can transmit and receive information to and from the second slave device 400, like the master device 200.

The master device 200 is a computer serving as a grandmaster in the PTP, for example. The master device 200 retains the highest quality clock as a reference time in the time synchronization system 100. The master device 200 is not necessarily the grandmaster and may also be a computer serving as a boundary clock retaining the time having no error relative to the reference time of the grandmaster, for example, provided that the master device 200 retains the reference time in the PTP. Specifically, the master device 200 first transmits a Sync message and a Follow_Up message in this order to the first slave device 300. The master device 200 then receives a Delay_Req message from the first slave device 300 and then transmits a Delay_Resp message to the first slave device 300.

Figure 2:
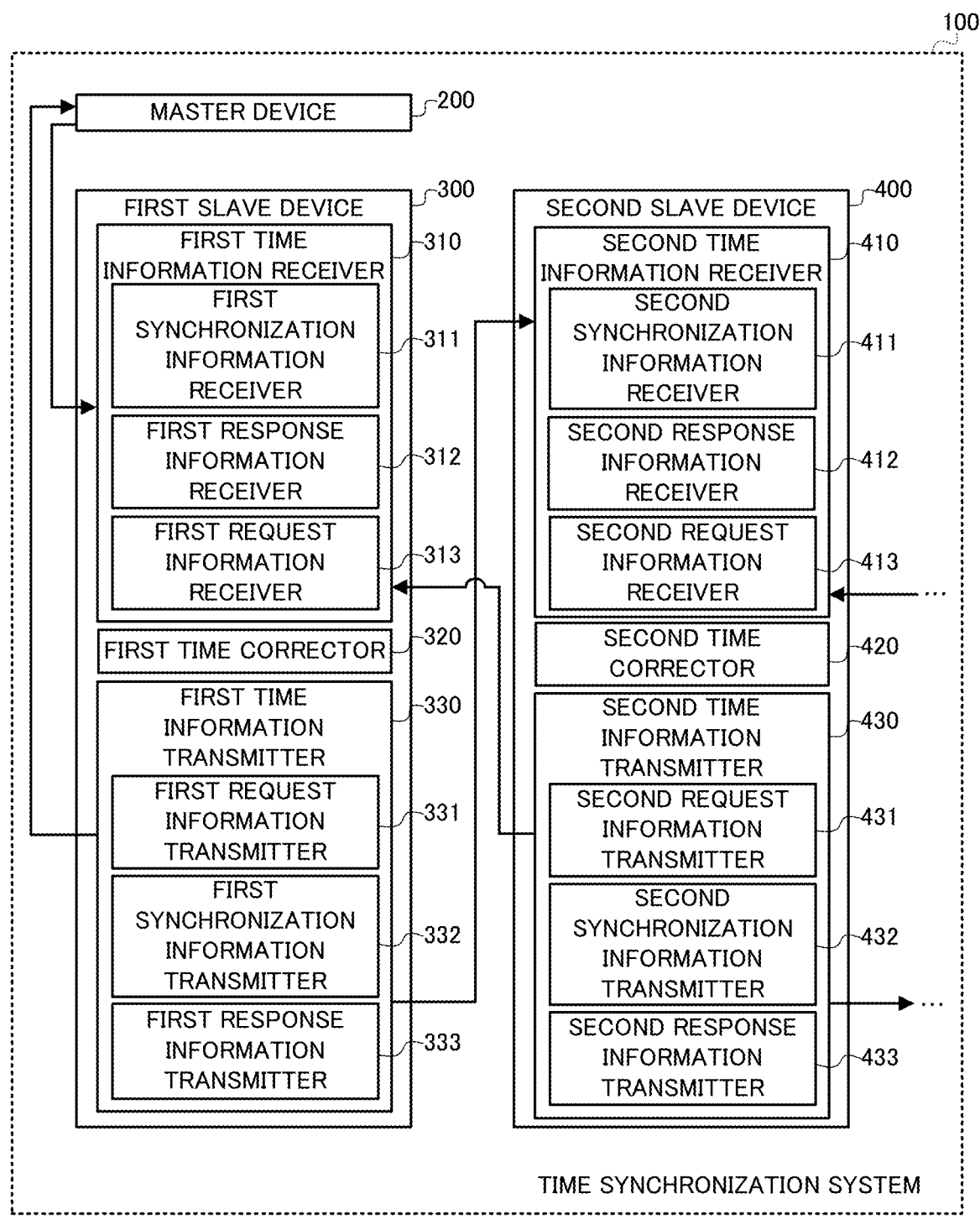
FIG. 2 illustrates a functional configuration of the time synchronization system according to the embodiment.

FIG. 2 illustrates a functional configuration of the time synchronization system according to the embodiment.

The first slave device 300 and the second slave device 400 are computers serving as boundary clocks in the PTP, for example. As illustrated in FIG. 2, the first slave device 300 includes a first time information receiver 310, which is an example of a time information receiver, to receive time information that is based on the reference time and transmitted from the master device 200. The first slave device 300 also includes a first time corrector 320, which is an example of a time corrector, to execute time correction, and a first time information transmitter 330, which is an example of a time information transmitter, to transmit the time information to the second slave device 400.

The first time information receiver 310 includes a first synchronization information receiver 311, which is an example of a synchronization information receiver, to receive synchronization information transmitted from the master device 200, and a first response information receiver 312, which is an example of a response information receiver, to receive response information transmitted from the master device 200. The first time information receiver 310 further includes a first request information receiver 313, which is an example of a request information receiver, to receive request information transmitted from the second slave device 400.

The first time information transmitter 330 includes a first request information transmitter 331, which is an example of a request information transmitter, to transmit request information to the master device 200. The first time information transmitter 330 also includes a first synchronization information transmitter 332, which is an example of a synchronization information transmitter, to transmit synchronization information to the second slave device 400, and a first response information transmitter 333, which is an example of a response information transmitter, to transmit response information to the second slave device 400.

Specifically, the first synchronization information receiver 311 receives a Sync message and a Follow_Up message transmitted from the master device 200. The first request information transmitter 331 transmits a Delay_Req message to the master device 200. The first response information receiver 312 receives a Delay_Resp message transmitted from the master device 200. In addition, the first synchronization information transmitter 332 transmits a Sync message and a Follow_Up message to the second slave device 400. The first request information receiver 313 receives a Delay_Req message transmitted from the second slave device 400. The first response information transmitter 333 transmits a Delay_Resp message to the second slave device 400.

The first time corrector 320 executes time correction on the basis of the propagation delay time d against the master device 200, which is calculated from times Ta1 to Ta4 identified through transmission and reception of messages to and from the master device 200 via the first synchronization information receiver 311, the first request information transmitter 331, and the first response information receiver 312. Specifically, the first time corrector 320 starts time correction from the timing when the first response information receiver 312 completes reception of the Delay_Resp message. First, the first time corrector 320 identifies the second time Ta2 indicating the time of reception of the Sync message by the first synchronization information receiver 311. The first time corrector 320 then identifies, from the Follow_Up message received by the first synchronization information receiver 311, the first time Ta1 indicating the time of transmission of the Sync message from the master device 200. The first time corrector 320 then identifies the third time Ta3 indicating the time of transmission of the Delay_Req message from the first request information transmitter 331 to the master device 200. The first time corrector 320 then identifies, from the Delay_Resp message received by the first response information receiver 312, the fourth time Ta4 indicating the time of reception of the Delay_Req message by the master device 200. The first time corrector 320 then calculates a propagation delay time d using the above-mentioned Expression (1) assuming that $T1=Ta1$, $T2=Ta2$, $T3=Ta3$, $T4=Ta4$, and calculates a correction value tc using the above-mentioned Expression (2), and then executes time correction on the basis of the calculated correction value tc.

The first synchronization information transmitter 332 transmits synchronization information that is based on the corrected time, during a period from time correction by the first time corrector 320 until reception of new synchronization information by the first synchronization information receiver 311. For example, the first synchronization information transmitter 332 starts transmission of synchronization information from the timing of completion of time correction by the first time corrector 320. Specifically, the first synchronization information transmitter 332 starts transmission of the Sync message from the timing of completion of time correction by the first time corrector 320.

The first time corrector 320 is not allowed to execute time correction during the period from transmission of the Sync message from the first synchronization information transmitter 332 until reception of the Delay_Req message by the first request information receiver 313. For example, the first slave device 300 may keep a flag indicating prohibition of time correction in the on state during the period from transmission of the Sync message until reception of the Delay_Req message, and may prohibit the first time corrector 320 from executing time correction while the flag is in the on state.

The second slave device 400 includes a second time information receiver 410, which is an example of a time information receiver, to receive time information transmitted from the first slave device 300, and a second time corrector 420, which is an example of a time corrector, to execute time correction. The second slave device 400 also includes a second time information transmitter 430, which is an example of a time information transmitter, to transmit time information.

The second time information receiver 410 includes a second synchronization information receiver 411, which is an example of a synchronization information receiver, to receive synchronization information transmitted from the first slave device 300, and a second response information receiver 412, which is an example of a response information receiver, to receive response information transmitted from the first slave device 300. The second time information receiver 410 further includes a second request information receiver 413, which is an example of a request information receiver, to receive, in the case where a third slave device (not illustrated) is connected to the second slave device 400, request information transmitted from the third slave device.

The second time information transmitter 430 includes a second request information transmitter 431, which is an example of a request information transmitter, to transmit request information to the first slave device 300. The second time information transmitter 430 also includes a second synchronization information transmitter 432, which is an example of a synchronization information transmitter, to transmit synchronization information to the third slave device, and a second response information transmitter 433, which is an example of a response information transmitter, to transmit response information to the third slave device, in the case where the third slave device is connected.

Specifically, the second synchronization information receiver 411 receives a Sync message and a Follow_Up message transmitted from the first synchronization information transmitter 332. The second request information transmitter 431 transmits a Delay_Req message to the first request information receiver 313. The second response information receiver 412 receives a Delay_Resp message transmitted from the first response information transmitter 333. In addition, the second synchronization information transmitter 432 transmits a Sync message and a Follow_Up message to the third slave device. The second request information receiver 413 receives a Delay_Req message transmitted from the third slave device. The second response information transmitter 433 transmits a Delay_Resp message to the third slave device.

The second time corrector 420 executes time correction on the basis of the propagation delay time d against the first slave device 300, which is calculated from times Tb1 to Tb4 identified through transmission and reception of messages to and from the first slave device 300 via the second synchronization information receiver 411, the second request information transmitter 431, and the second response information receiver 412, like the first time corrector 320. Specifically, the second time corrector 420 starts time correction from the timing when the second response information receiver 412 completes reception of the Delay_Resp message. First, the second time corrector 420 identifies the second time Tb2 indicating the time of reception of the Sync message by the second synchronization information receiver 411. The second time corrector 420 then identifies, from the Follow_Up message received by the second synchronization information receiver 411, the first time Tb1 indicating the time of transmission of the Sync message from the first synchronization information transmitter 332. The second time corrector 420 then identifies the third time Tb3 indicating the time of transmission of the Delay_Req message from the second request information transmitter 431 to the first request information receiver 313. The second time corrector 420 then identifies, from the Delay_Resp message received by the second response information receiver 412, the fourth time Tb4 indicating the time of reception of the Delay_Req message by the second response information receiver 412. The second time corrector 420 then calculates a propagation delay time d using the above-mentioned Expression (1) assuming that T1=Tb1, T2=Tb2, T3=Tb3, T4=Tb4, calculates a correction value tc using the above-mentioned Expression (2), and then executes time correction on the basis of the calculated correction value tc, like the first time corrector 320.

In the case where the third slave device is connected to the second slave device 400, the second synchronization information transmitter 432 transmits synchronization information that is based on the corrected time, during a period from time correction by the second time corrector 420 until reception of new synchronization information by the second synchronization information receiver 411, like the first synchronization information transmitter 332. For example, the second synchronization information transmitter 432 starts transmission of synchronization information from the timing when the second time corrector 420 completes time correction. Specifically, the second synchronization information transmitter 432 starts transmission of the Sync message from the timing when the second time corrector 420 completes time correction.

The second time corrector 420 is not allowed to execute time correction during the period from transmission of the Sync message from the second synchronization information transmitter 432 until reception of the Delay_Req message by the second request information receiver 413, for example, because the flag indicating prohibition of time correction is in the on state, like the first time corrector 320.

Figure 3:
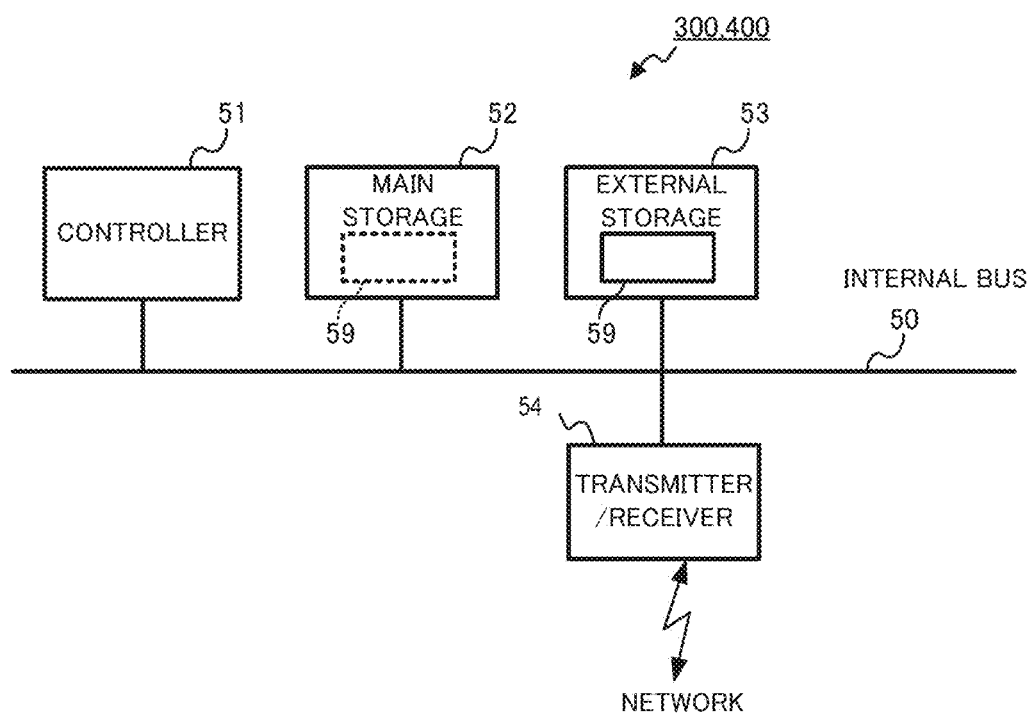
FIG. 3 is a block diagram illustrating a hardware configuration of each of a first slave device and a second slave device according to the embodiment.

FIG. 3 is a block diagram illustrating a hardware configuration of each of the first slave device and the second slave device according to the embodiment.

Each of the first slave device 300 and the second slave device 400 illustrated in FIGS. 1 and 2 includes the hardware components illustrated in FIG. 3. The first slave device 300 includes a controller 51, a main storage 52, an external storage 53, and a transmitter/receiver 54. The second slave device 400 includes a controller 51, a main storage 52, an external storage 53, and a transmitter/receiver 54, like the first slave device 300. The master device 200 may also include a controller 51, a main storage 52, an external storage 53, and a transmitter/receiver 54, which are not illustrated, like the first slave device 300 and the second slave device 400.

The controller 51 executes processes in accordance with a control program 59. The controller 51 includes a central processing unit (CPU). The controller 51 serves as the first time corrector 320 included in the first slave device 300 in accordance with the control program 59. The controller 51 also serves as the second time corrector 420 included in the second slave device 400 in accordance with the control program 59.

The control program 59 is loaded in the main storage 52, which is used as a work area of the controller 51. The main storage 52 includes a random-access memory (RAM).

The external storage 53 preliminarily stores the control program 59. The external storage 53 feeds data stored in this program to the controller 51 and stores data fed from the controller 51, under the instructions from the controller 51. The external storage 53 includes a non-volatile memory, such as flash memory, hard disk drive (HDD) or solid state drive (SSD).

The transmitter/receiver 54 transmits and receives information. The transmitter/receiver 54 includes a communication component, such as network termination unit or wireless communication unit, to establish connection to a network. The transmitter/receiver 54 serves as the first time information receiver 310, the first synchronization information receiver 311, the first response information receiver 312, the first request information receiver 313, the first time information transmitter 330, the first request information transmitter 331, the first synchronization information transmitter 332, and the first response information transmitter 333 included in the first slave device 300. The transmitter/receiver 54 also serves as the second time information receiver 410, the second synchronization information receiver 411, the second response information receiver 412, the second request information receiver 413, the second time information transmitter 430, the second request information transmitter 431, the second synchronization information transmitter 432, and the second response information transmitter 433 included in the second slave device 400.

In the first slave device 300, each of the main storage 52, the external storage 53, and the transmitter/receiver 54 is connected to the controller 51 via an internal bus 50. In the second slave device 400, each of the main storage 52, the external storage 53, and the transmitter/receiver 54 is connected to the controller 51 via the internal bus 50, as in the first slave device 300.

The first slave device 300 illustrated in FIGS. 1 and 2 performs the functions of the first time information receiver 310, the first synchronization information receiver 311, the first response information receiver 312, the first request information receiver 313, the first time corrector 320, the first time information transmitter 330, the first request information transmitter 331, the first synchronization information transmitter 332, and the first response information transmitter 333, because the controller 51 uses the main storage 52, the external storage 53, and the transmitter/receiver 54 as resources. For example, the first slave device 300 executes a first time information receiving step, which is an example of a time information receiving step, by the first time information receiver 310. The first slave device 300 also executes a first synchronization information receiving step, which is an example of a synchronization information receiving step, by the first synchronization information receiver 311, a first response information receiving step, which is an example of a response information receiving step, by the first response information receiver 312, and a first request information receiving step, which is an example of a step of receiving request information, by the first request information receiver 313. The first slave device 300 further executes a first time correcting step, which is an example of a step of correcting a time, by the first time corrector 320. The first slave device 300 also executes a first time information transmitting step, which is an example of a time information transmitting step, by the first time information transmitter 330. The first slave device 300 further executes a first request information transmitting step, which is an example of a request information transmitting step, by the first request information transmitter 331, a first synchronization information transmitting step, which is an example of a step of transmitting synchronization information, by the first synchronization information transmitter 332, and a first response information transmitting step, which is an example of a step of transmitting response information, by the first response information transmitter 333.

The second slave device 400 performs the functions of the second time information receiver 410, the second synchronization information receiver 411, the second response information receiver 412, the second request information receiver 413, the second time corrector 420, the second time information transmitter 430, the second request information transmitter 431, the second synchronization information transmitter 432, and the second response information transmitter 433, because the controller 51 uses the main storage 52, the external storage 53, and the transmitter/receiver 54 as resources. For example, the second slave device 400 executes a first time information receiving step, which is an example of a time information receiving step, by the second time information receiver 410. The second slave device 400 also executes a second synchronization information receiving step, which is an example of a synchronization information receiving step, by the second synchronization information receiver 411, a second response information receiving step, which is an example of a response information receiving step, by the second response information receiver 412, and a second request information receiving step, which is an example of a step of receiving request information, by the second request information receiver 413. The second slave device 400 further executes a second time correcting step, which is an example of a step of correcting a time, by the second time corrector 420. The second slave device 400 also executes a second time information transmitting step, which is an example of a time information transmitting step, by the second time information transmitter 430. The second slave device 400 further executes a second request information transmitting step, which is an example of a request information transmitting step, by the second request information transmitter 431, a second synchronization information transmitting step, which is an example of a step of transmitting synchronization information, by the second synchronization information transmitter 432, and a second response information transmitting step, which is an example of a step of transmitting response information, by the second response information transmitter 433.

Each of the first slave device 300 and the second slave device 400 does not have to include a manipulation unit to feed input data to the controller 51, because of the transmitter/receiver 54 responsible for input and output of data, but may include such a manipulation unit. In this case, the manipulation unit may include an information input component, such as keyboard, mouse, touch panel, or manipulation button.

Each of the first slave device 300 and the second slave device 400 does not have to include a display to display input or output data, but may include such a display. In this case, the display may include a display unit, such as liquid crystal display (LCD) or organic electro-luminescence (EL) display.

Figure 4:
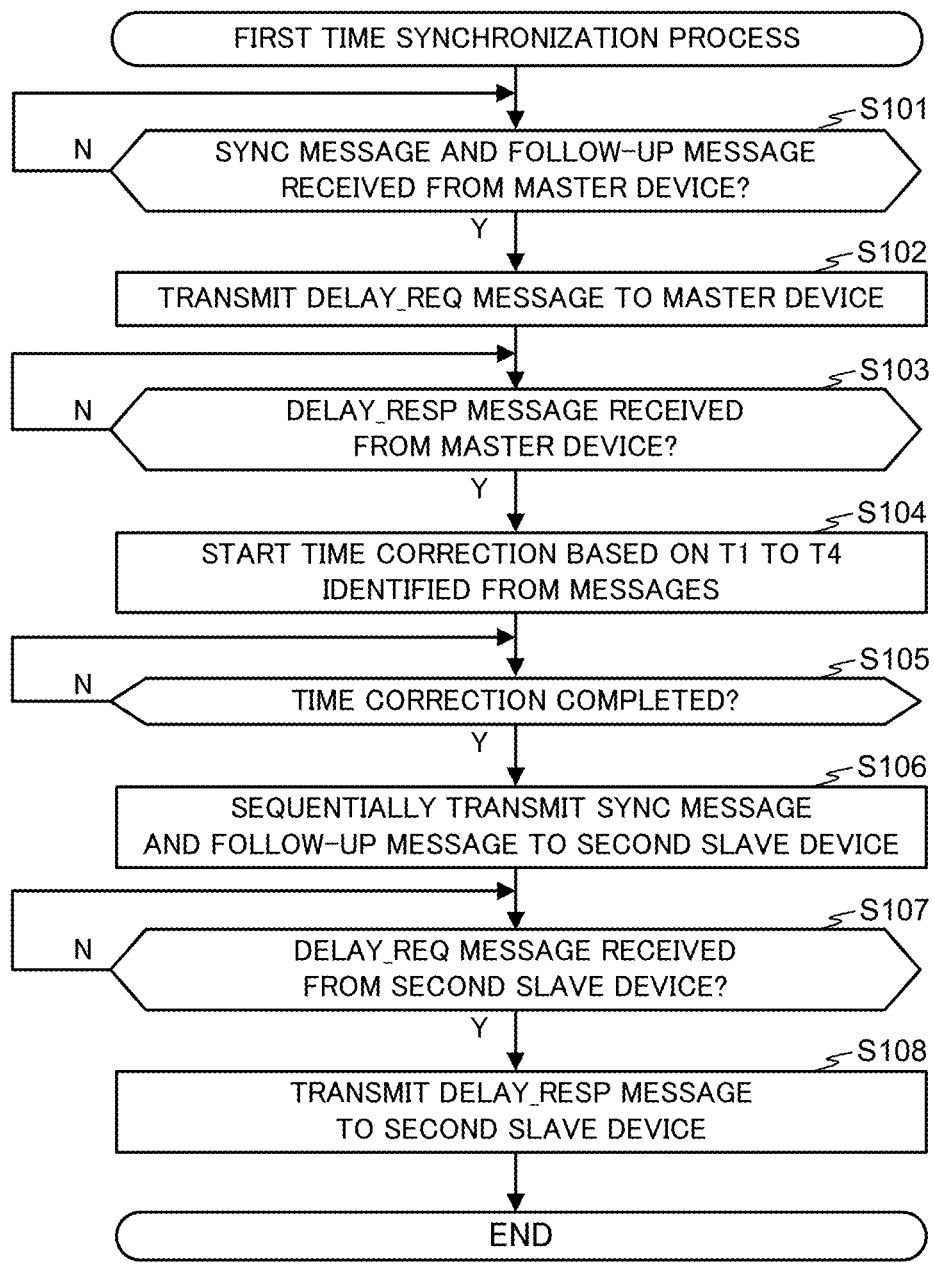
FIG. 4 is a flowchart illustrating a flow of a first time synchronization process according to the embodiment.

FIG. 4 is a flowchart illustrating a flow of a first time synchronization process according to the embodiment.

The following description is directed to an operation of the first slave device 300 for synchronizing the time with the master device 200, with reference to the flowchart of FIG. 4. First, as illustrated in FIG. 4, the first slave device 300 determines whether a Sync message and a Follow_Up message are received by the first synchronization information receiver 311 from the master device 200 (Step S101). When neither of the Sync message and the Follow_Up message are received (Step S101; N), the first slave device 300 repeats Step S101 until the first synchronization information receiver 311 receives a Sync message and a Follow_Up message. In contrast, when the Sync message and the Follow_Up message are received (Step S101; Y), the first request information transmitter 331 transmits a Delay_Req message to the master device 200 (Step S102).

After transmission of the Delay_Req message, the first slave device 300 determines whether a Delay_Resp message is received by the first response information receiver 312 from the master device 200 (Step S103). When no Delay_Resp message is received (Step S103; N), the first slave device 300 repeats Step S103 until the first response information receiver 312 receives a Delay_Resp message. In contrast, when the Delay_Resp message is received (Step S103; Y), the first time corrector 320 starts time correction on the basis of the first time Ta1, the second time Ta2, the third time Ta3, and the fourth time Ta4 identified through transmission and reception of messages (Step S104). After the start of time correction, the first slave device 300 determines whether the first time corrector 320 has completed time correction (Step S105). When the time correction has not been completed (Step S105; N), the first slave device 300 repeats Step S105 until the first time corrector 320 completes time correction. In contrast, when the time correction has been completed (Step S105; Y), the first synchronization information transmitter 332 transmits a Sync message and a Follow_Up message in this order to the second slave device 400 (Step S106).

After transmission of the Follow_Up message, the first slave device 300 determines whether a Delay_Req message is received by the first request information receiver 313 from the second slave device 400 (Step S107). When no Delay_Req message is received (Step S107; N), the first slave device 300 repeats Step S107 until the first request information receiver 313 receives a Delay_Req message from the second slave device 400. In contrast, when the Delay_Req message is received (Step S107; Y), the first response information transmitter 333 transmits a Delay_Resp message to the second slave device 400 (Step S108), and then terminates the first time synchronization process.

Figure 5:
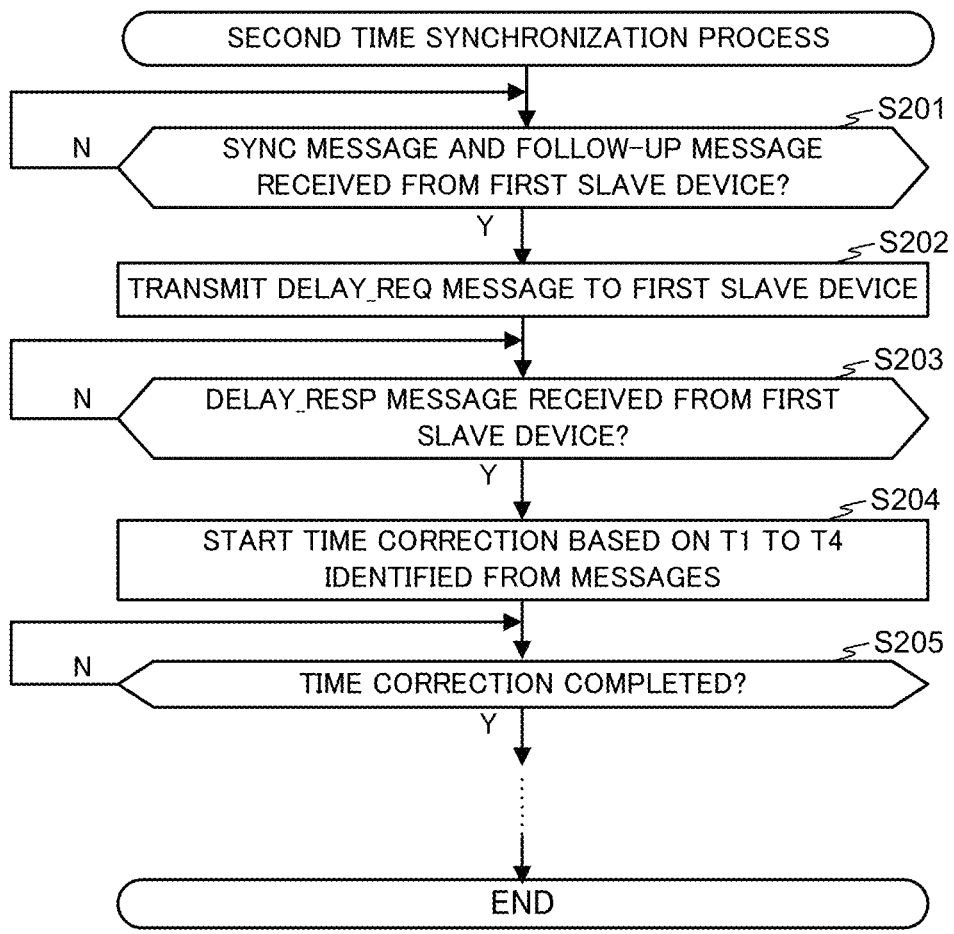
FIG. 5 is a flowchart illustrating a flow of a second time synchronization process according to the embodiment.

FIG. 5 is a flowchart illustrating a flow of a second time synchronization process according to the embodiment.

The following description is directed to an operation of the second slave device 400 for synchronizing the time with the master device 200 via the first slave device 300, with reference to the flowchart of FIG. 5. First, as illustrated in FIG. 5, the second slave device 400 determines whether a Sync message and a Follow_Up message are received by the second synchronization information receiver 411 from the first slave device 300 (Step S201). When neither of the Sync message and the Follow_Up message are received (Step S201; N), the second slave device 400 repeats Step S201 until the second synchronization information receiver 411 receives a Sync message and a Follow_Up message. In contrast, when the Sync message and the Follow_Up message are received (Step S201; Y), the second request information transmitter 431 transmits a Delay_Req message to the first slave device 300 (Step S202).

After transmission of the Delay_Req message, the second slave device 400 determines whether a Delay_Resp message is received by the second response information receiver 412 from the first slave device 300 (Step S203). When no Delay_Resp message is received (Step S203; N), the second slave device 400 repeats Step S203 until the second response information receiver 412 receives a Delay_Resp message. In contrast, when the Delay_Resp message is received (Step S203; Y), the second time corrector 420 starts time correction on the basis of the first time Tb1, the second time Tb2, the third time Tb3, and the fourth time Tb4 identified through transmission and reception of messages (Step S204). After the start of time correction, the second slave device 400 determines whether the second time corrector 420 has completed time correction (Step S205). When the time correction has not been completed (Step S205; N), the second slave device 400 repeats Step S205 until the second time corrector 420 completes time correction. In contrast, when the time correction has been completed (Step S205; Y), the second slave device 400 terminates the second time synchronization process unless a third slave device is connected to the second slave device 400.

In the case where a third slave device is connected, the second slave device 400 executes the steps similar to Steps S106 to S108 of the first time synchronization process and then terminates the second time synchronization process, although this case is not illustrated. Specifically, the second synchronization information transmitter 432 transmits a Sync message and a Follow_Up message in this order to the third slave device. When the second request information receiver 413 receives a Delay_Req message from the third slave device, the second response information transmitter 433 transmits a Delay_Resp message to the third slave device, and then terminates the second time synchronization process.

Figure 6:
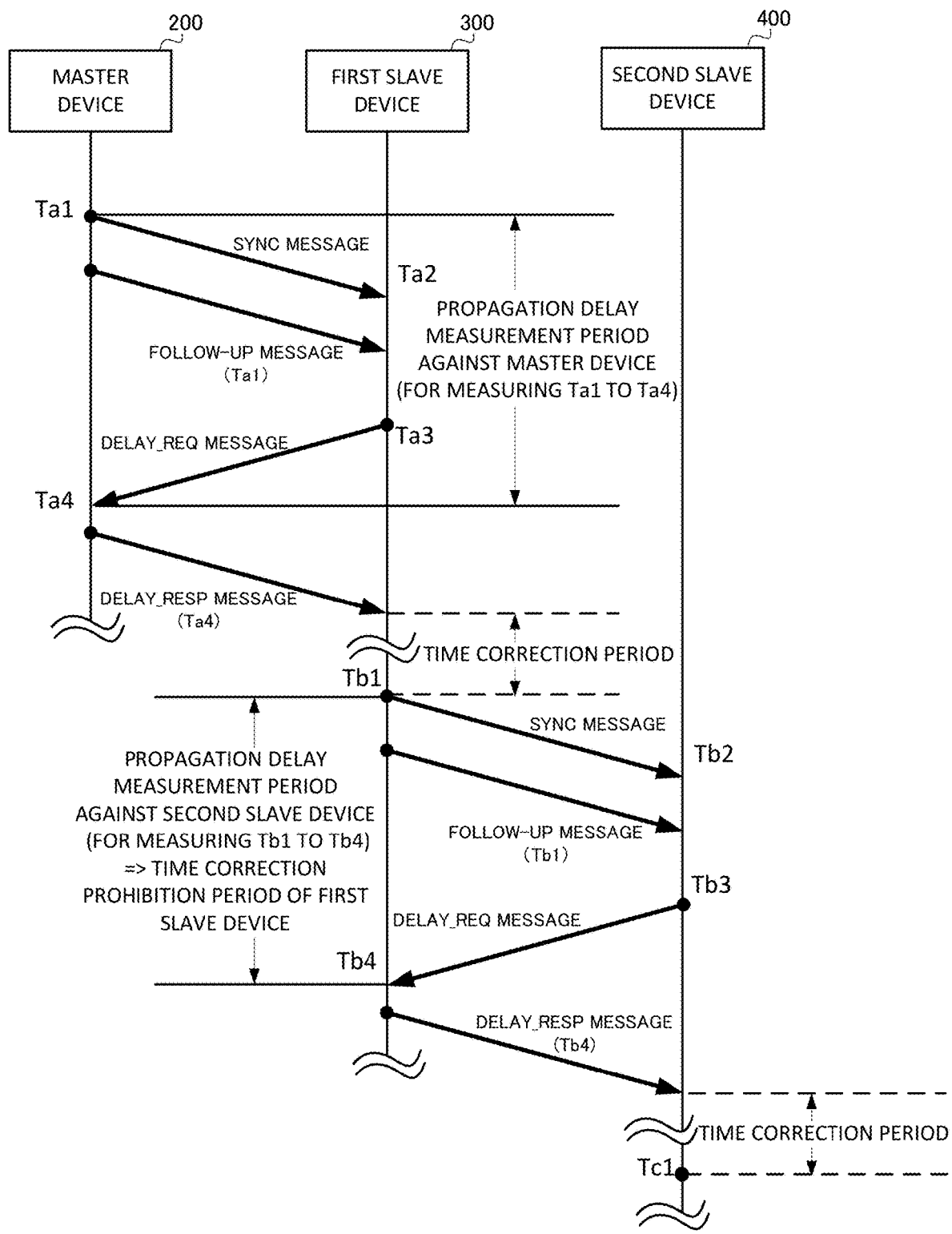
FIG. 6 is a timing chart illustrating an exemplary manner of transmission and reception of messages in the time synchronization system according to the embodiment.

FIG. 6 is a timing chart illustrating an exemplary manner of transmission and reception of messages in the time synchronization system according to the embodiment.

The following description is directed to timings of transmission and reception of messages among the master device 200, the first slave device 300, and the second slave device 400 in the time synchronization system and timings of time correction by the first slave device 300 and the second slave device 400, with reference to the timing chart of FIG. 6. As illustrated in FIG. 6, the master device 200 transmits a Sync message to the first slave device 300 at the first time Ta1, and the first slave device 300 receives the Sync message at the second time Ta2. The master device 200, after transmission of the Sync message, transmits a Follow_Up message from which the first time Ta1 can be identified to the first slave device 300, and the first slave device 300 receives the Follow_Up message and identifies the first time Ta1 therefrom.

The first slave device 300, after reception of the Follow_Up message, transmits a Delay_Req message to the master device 200 at the third time Ta3, and the master device 200 receives the Delay_Req message at the fourth time Ta4. The master device 200, after reception of the Delay_Req message, transmits a Delay_Resp message from which the fourth time Ta4 can be identified to the first slave device 300, and the first slave device 300 receives the Delay_Resp message and identifies the fourth time Ta4 therefrom.

That is, the first slave device 300 measures the first time Ta1, the second time Ta2, the third time Ta3, and the fourth time Ta4 during a period from transmission of the Sync message until reception of the Delay_Req message by the master device 200. The first slave device 300 receiving the Delay_Resp message from which the fourth time Ta4 can be identified at last, can calculate a propagation delay time d. The period from transmission of the Sync message until reception of the Delay_Req message by the master device 200 is hereinafter called a propagation delay measurement period between the first slave device 300 and the master device 200.

After elapse of the propagation delay measurement period between the first slave device 300 and the master device 200 and after reception of the Delay_Resp message, the first slave device 300 calculates a propagation delay time d from the measured first time Ta1, second time Ta2, third time Ta3, and fourth time Ta4 using the above-mentioned Expression (1). The first slave device 300 then calculates a correction value tc from the calculated propagation delay time d using the above-mentioned Expression (2), and executes time correction on the basis of the calculated correction value tc. The period from start of calculation of the propagation delay time d until completion of time correction by the first slave device 300 is hereinafter called a time correction period of the first slave device 300.

After elapse of the time correction period, the first slave device 300 transmits a Sync message to the second slave device 400 at the first time Tb1, and the second slave device 400 receives the Sync message at the second time Tb2 and initiates a propagation delay measurement period. The first slave device 300, after transmission of the Sync message, transmits a Follow_Up message from which the first time Tb1 can be identified to the second slave device 400, and the second slave device 400 receives the Follow_Up message and identifies the first time Tb1 therefrom. The second slave device 400, after reception of the Follow_Up message, transmits a Delay_Req message to the first slave device 300 at the third time Tb3, and the first slave device 300 receives the Delay_Req message at the fourth time Tb4.

The first slave device 300, after reception of the Delay_Req message, transmits a Delay_Resp message from which the fourth time Tb4 can be identified to the second slave device 400, and the second slave device 400 receives the Delay_Resp message, identifies the fourth time Tb4 therefrom, and then terminates the propagation delay measurement period. The first slave device 300 is prohibited from executing new time correction during the period from transmission of the Sync message until reception of the Delay_Req message, that is, the propagation delay measurement period between the first slave device 300 and the second slave device 400. The period from transmission of the Sync message until reception of the Delay_Req message by the first slave device 300 is hereinafter also called a time correction prohibition period of the first slave device 300.

After elapse of the propagation delay measurement period between the first slave device 300 and the second slave device 400 and after reception of the Delay_Resp message, the second slave device 400 initiates a time correction period, and calculates a propagation delay time d from the measured first time Tb1, second time Tb2, third time Tb3, and fourth time Tb4 using the above-mentioned Expression (1). The second slave device 400 then calculates a correction value tc from the calculated propagation delay time d using the above-mentioned Expression (2), executes time correction on the basis of the calculated correction value tc, and then terminates the time correction period.

As described above, in the time synchronization system 100 according to this embodiment, the first slave device 300 is connected between the master device 200 to retain the reference time and the second slave device 400, and executes time synchronization with the master device 200 in accordance with the PTP, together with the second slave device 400.

The first synchronization information transmitter 332 transmits a Sync message and a Follow_Up message in this order to the second slave device 400. The first request information receiver 313 receives a Delay_Req message, which is transmitted from the second slave device 400 after transmission of the Follow_Up message from the first synchronization information transmitter 332. The first response information transmitter 333 transmits, to the second slave device 400, a Delay_Resp message responding to the Delay_Req message received by the first request information receiver 313. The first time corrector 320 executes time correction on the basis of the propagation delay time d against the master device 200, which is calculated from the times Ta1 to Ta4 identified through transmission and reception of messages to and from the master device 200, during a period different from the period from transmission of the Sync message from the first synchronization information transmitter 332 until reception of the Delay_Req message by the first request information receiver 313.

The first slave device 300 thus does not execute time correction during the period from transmission of the Sync message from the first slave device 300 to the second slave device 400 until reception of the Delay_Req message from the second slave device 400, that is, during the propagation delay measurement period between the first slave device 300 and the second slave device 400. This configuration can prevent an error from occurring in the propagation delay time calculated at the second slave device 400 during this period, even if timings of time synchronization are determined for the first slave device 300 and the second slave device 400 independently from each other. This time synchronization system can therefore reduce a time error of the second slave device 400, in comparison to a time synchronization system in which time correction is executed during the period from transmission of a Sync message from a first slave device to a second slave device until reception of a Delay_Req message from the second slave device.

The IEEE 1588 standard defines neither of the timing of time correction by a boundary clock and the timing of transmission of a message to a slave device connected to the boundary clock. An existing time synchronization system that executes time synchronization in accordance with the PTP thus suffers from a problem that individual slave devices serving as boundary clocks are provided by different manufacturers and have different specifications, for example, and therefore provide different accuracies of time synchronization. For example, in the existing time synchronization system, a first slave device serving as a boundary clock may execute time correction through transmission and reception of messages to and from a master device, in parallel to transmission and reception of messages between the first slave device and a second slave device, that is, during a propagation delay measurement period between the first slave device and the second slave device.

Figure 7:
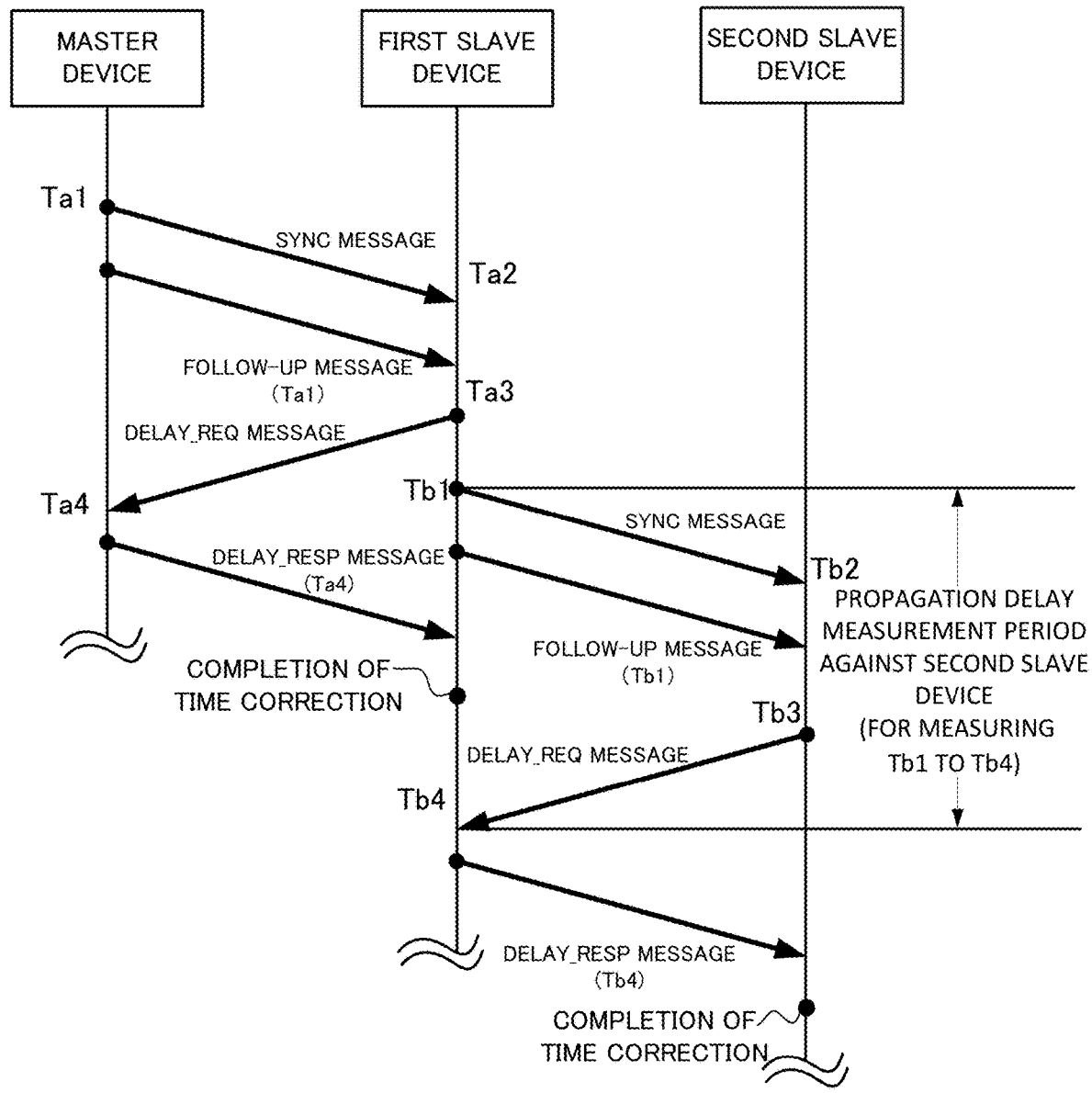
FIG. 7 is a timing chart illustrating an exemplary manner of transmission and reception of messages in an existing time synchronization system.

FIG. 7 is a timing chart illustrating an exemplary manner of transmission and reception of messages in an existing time synchronization system.

The following description assumes an exemplary case where the first slave device transmits a Sync message and a Follow_Up message to the second slave device and then receives a Delay_Resp message from the master device in the existing time synchronization system, as illustrated in FIG. 7. In this case, the first slave device may complete time correction before reception of a Delay_Req message from the second slave device. The first slave device accordingly transmits a Follow_Up message from which the first time Tb1 that is based on the uncorrected time can be identified, and then transmits a Delay_Resp message from which the fourth time Tb4 that is based on the corrected time can be identified. As a result, the first slave device completes time correction during a propagation delay measurement period between the first slave device and the second slave device, and the second slave device executes time correction on the basis of the first time Tb1 that is based on the uncorrected time of the first slave device and the fourth time Tb4 that is based on the corrected time.

Figure 8:
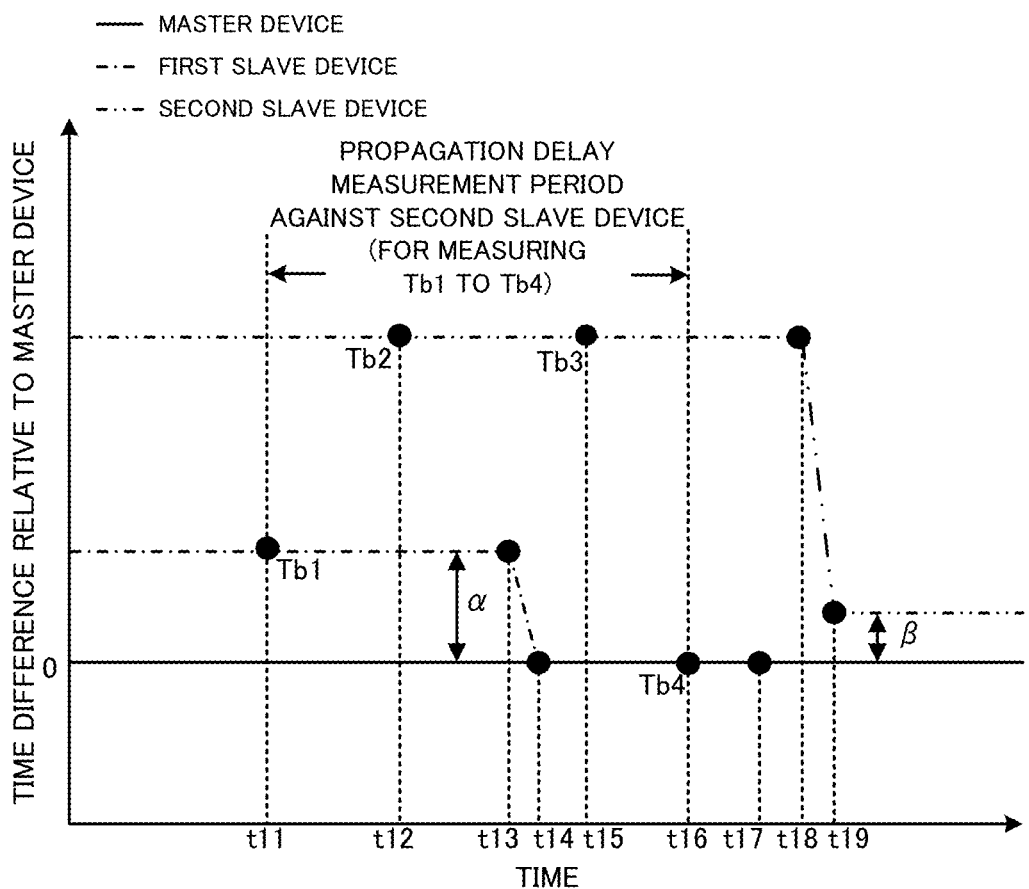
FIG. 8 illustrates exemplary changes in time errors in the existing time synchronization system.

FIG. 8 illustrates exemplary changes in time errors in the existing time synchronization system. In FIG. 8, a change in time difference between the first slave device and the master device is represented by the dashed and single-dotted line, and a change in time difference between the second slave device and the master device is represented by the dashed and double-dotted line.

In this case, as illustrated in FIG. 8, the first slave device first transmits a Sync message at an 11th timing t11 and then transmits a Follow_Up message from which the first time Tb1 that is based on the uncorrected time can be identified to the second slave device. The second slave device then receives the Sync message at a 12th timing t12 and identifies the second time Tb2, and then receives the Follow_Up message and identifies the first time Tb1 therefrom.

The first slave device then starts time correction at a 13th timing t13, and completes time correction at a 14th timing 14. The second slave device then transmits a Delay_Req message to the first slave device and identifies the third time Tb3 at a 15th timing t15. The first slave device then receives the Delay_Req message at a 16th timing t16, and transmits a Delay_Resp message from which the fourth time Tb4 that is based on the corrected time can be identified to the second slave device at a 17th timing t17. The second slave device then receives the Delay_Resp message, completes measurement of the first time Tb1 to the fourth time Tb4, and starts time correction at an 18th timing t18, and then completes time correction at a 19th timing t19.

As illustrated in FIG. 8, although the time correction at the first slave device succeeds to reset the time difference from the master device to ( ), the time correction at the second slave device unfortunately leaves a time difference β. Assuming that a indicates a time difference between the first slave device and the master device before correction and d' indicates a propagation delay time in the case where the time correction leaves the time difference β, the propagation delay time d' is calculated using the following Expression (3), and the time difference β is calculated using the following Expression (4).

$$d'=\{(Tb4+\alpha-Tb1)-(Tb3-Tb2)\}/2=d+\alpha/2 \quad (3)$$

$$\beta=d'-d=\alpha/2 \quad (4)$$

Figure 9:
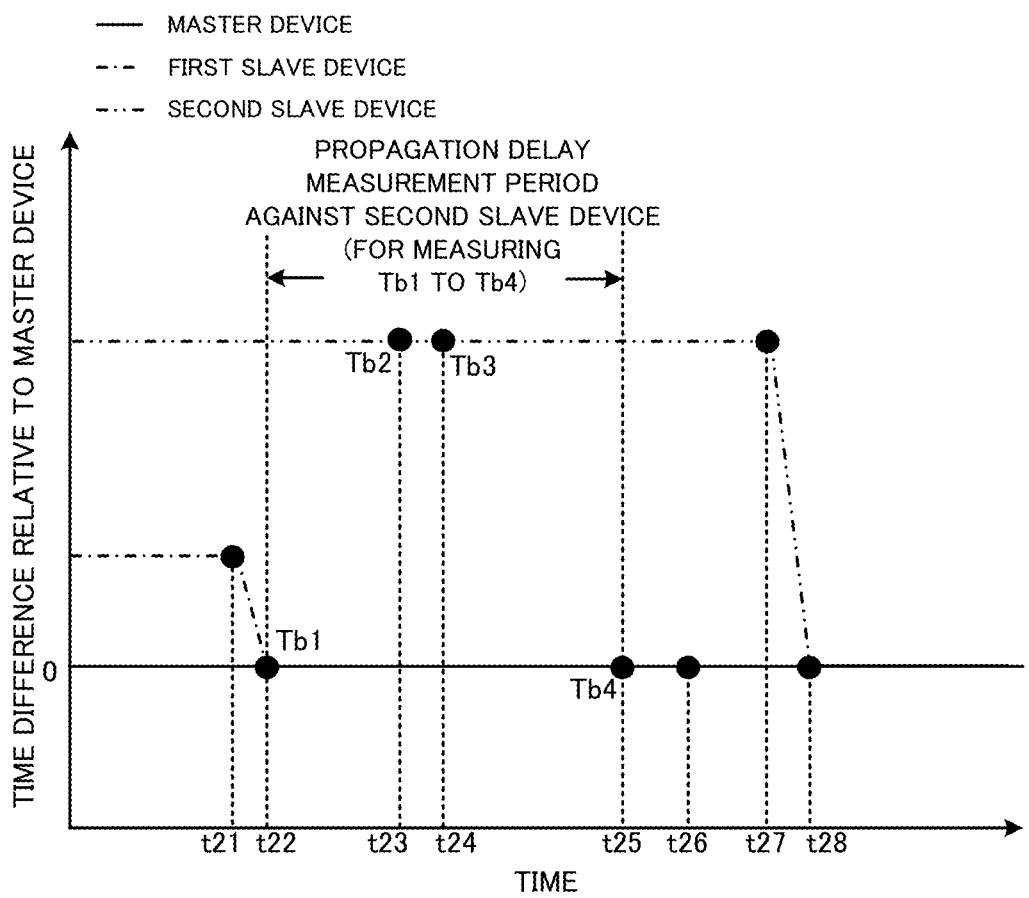
FIG. 9 illustrates exemplary changes in time errors in the time synchronization system according to the embodiment.

FIG. 9 illustrates exemplary changes in time errors in the time synchronization system according to the embodiment. In FIG. 9, a change in time difference between the first slave device and the master device is represented by the dashed and single-dotted line, and a change in time difference between the second slave device and the master device is represented by the dashed and double-dotted line, as in FIG. 8.

In contrast to the existing system, in the time synchronization system 100 according to this embodiment, the second slave device 400 executes time correction on the basis of the first time Tb1 and the fourth time Tb4 that are based on the corrected time of the first slave device 300. Specifically, as illustrated in FIG. 9, the first slave device 300 first starts time correction at a 21st timing t21, completes time correction and transmits a Sync message at a 22nd timing t22, and then transmits a Follow_Up message from which the first time Tb1 that is based on the corrected time can be identified to the second slave device 400.

The second slave device 400 then receives the Sync message and identifies the second time Tb2 at a 23rd timing t23, and then receives the Follow_Up message and identifies the first time Tb1 therefrom. The second slave device 400 then transmits a Delay_Req message to the first slave device 300 at a 24th timing t24 and identifies the third time Tb3. The first slave device 300 then receives the Delay_Req message at a 25th timing t25, and transmits a Delay_Resp message from which the fourth time Tb4 based on the corrected time can be identified to the second slave device 400 at a 26th timing t26. The second slave device 400 then receives the Delay_Resp message, completes measurement of the first time Tb1 to the fourth time Tb4, and starts time correction at a 27th timing t27, and then completes time correction at a 28th timing t28.

As illustrated in FIG. 9, when the time correction at the first slave device 300 succeeds to reset the time difference from the master device 200 to 0, the time correction at the second slave device 400 also succeeds to reset the time difference from the master device 200 to 0.

The time synchronization system 100 according to this embodiment can therefore solve the above-mentioned problem in the existing time synchronization system.

In particular, the time synchronization system 100 according to this embodiment defines the propagation delay measurement period between the first slave device 300 and the second slave device 400 to be the time correction prohibition period, and controls the first slave device 300 such that the first time corrector 320 cannot execute time correction during this period, for example, by keeping the flag indicating prohibition of time correction in the on state.

This configuration can certainly prevent the first slave device 300 from executing time correction during the propagation delay measurement period between the first slave device 300 and the second slave device 400.

Although the time correction prohibition period in this embodiment is equal to the propagation delay measurement period between the first slave device 300 and the second slave device 400, that is, the period from transmission of the Sync message from the first slave device 300 to the second slave device 400 until reception of the Delay_Req message from the second slave device 400, this configuration is a mere example. For example, the time correction prohibition period may also be equal to a period from transmission of the Sync message from the first slave device 300 to the second slave device 400 until transmission of the Delay_Resp message to the second slave device 400, which follows reception of the Delay_Req message from the second slave device 400.

In the time synchronization system 100 according to this embodiment, the first synchronization information transmitter 332 starts transmission of the Sync message to the second slave device 400 from the timing of completion of time correction by the first time corrector 320.

The propagation delay measurement period between the first slave device 300 and the second slave device 400 can thus be initiated from the timing of completion of time correction by the first slave device 300, and the second slave device 400 can calculate a propagation delay time and execute time correction on the basis of the corrected time of the first slave device 300. This time synchronization system can shorten the period in which the second slave device 400 has a time error relative to the master device 200, in comparison to a time synchronization system in which transmission of a Sync message to a slave device is not started from the timing of completion of time correction.

Although the first slave device 300 preferably starts transmission of the Sync message to the second slave device 400 from the timing of completion of time correction by the first slave device 300 as in this embodiment, this configuration may be modified provided that the first slave device 300 does not execute time correction during the propagation delay measurement period between the first slave device 300 and the second slave device 400. For example, the first synchronization information transmitter 332 may start transmission of the Sync message to the second slave device 400 after elapse of a predetermined duration since completion of time correction by the first time corrector 320. Alternatively, the first synchronization information transmitter 332 may start transmission of the Sync message to the second slave device 400 before start of time correction by the first time corrector 320, for example.

Figure 10:
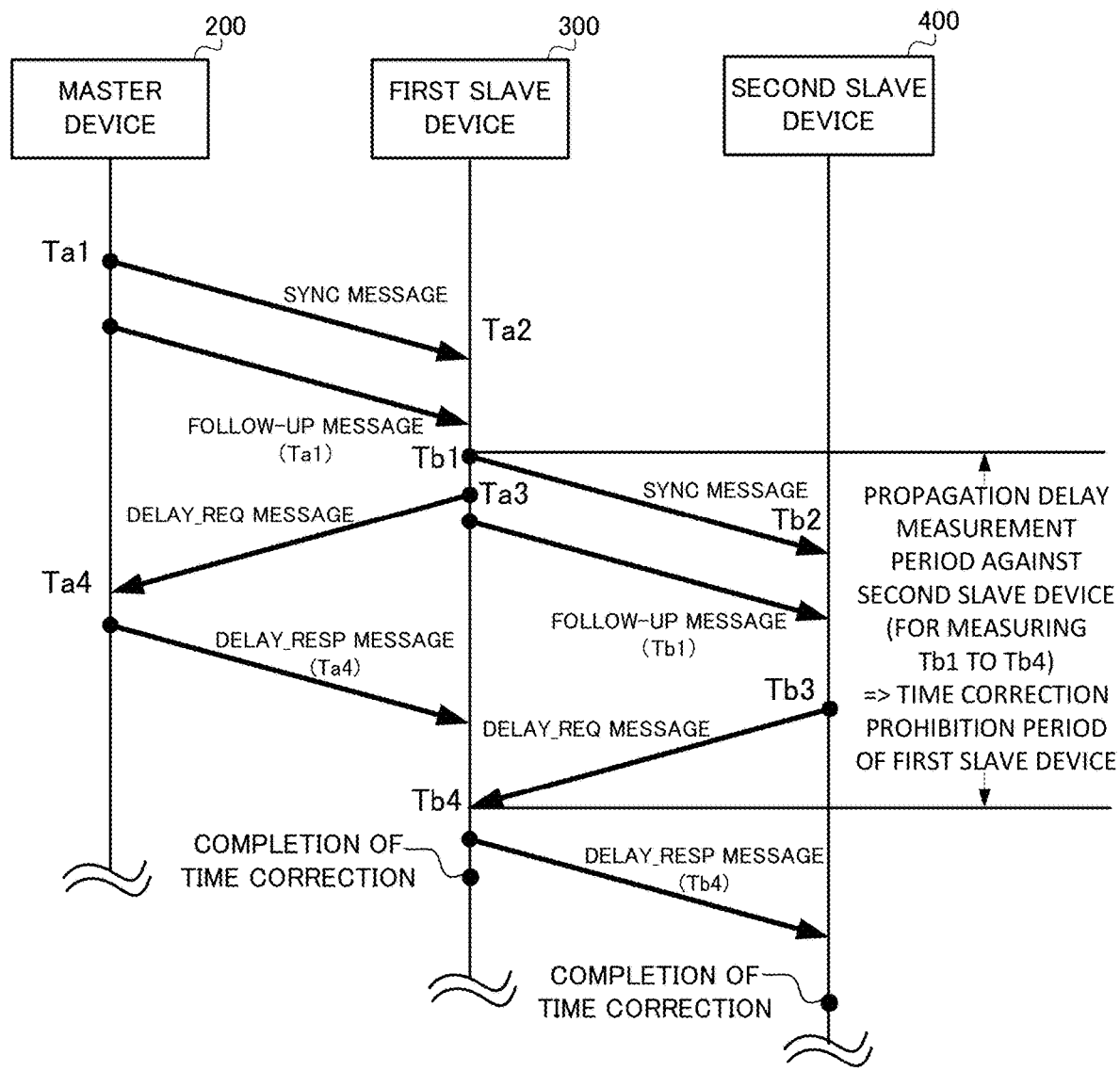
FIG. 10 is a timing chart illustrating an exemplary manner of transmission and reception of messages in a time synchronization system according to a modification of the embodiment.

FIG. 10 is a timing chart illustrating an exemplary manner of transmission and reception of messages in a time synchronization system according to a modification of the embodiment.

For example, as illustrated in FIG. 10, the first slave device 300 may transmit a Sync message to the second slave device 400 before transmitting a Delay_Req message to the master device 200. In this case, the first slave device 300 may transmit a Sync message to the second slave device 400, transmit a Delay_Req message to the master device 200, transmit a Follow_Up message to the second slave device 400, receive a Delay_Resp message from the master device 200, and then receive a Delay_Req message from the second slave device 400. In this case, as illustrated in FIG. 10, the period until reception of the Delay_Req message from the second slave device 400 is defined as the propagation delay measurement period between the first slave device 300 and the second slave device 400, that is, the time correction prohibition period of the first slave device 300. The first slave device 300 thus does not start time correction in response to reception of the Delay_Resp message from the master device 200, and may start time correction after elapse of this period until reception of the Delay_Req message from the second slave device 400.

In the time synchronization system 100 according to this embodiment, the first time corrector 320 starts time correction from the timing of completion of reception of the Delay_Resp message by the first response information receiver 312.

This time synchronization system can shorten the period in which the first slave device 300 has a time error relative to the master device 200, in comparison to a time synchronization system in which time correction is not started from the timing of completion of reception of a Delay_Resp message at a first slave device. The time synchronization system can also facilitate time correction to be completed before reception of a new Sync message at the first slave device 300 from the master device 200, in comparison to a time synchronization system in which time correction is not started from the timing of completion of reception of a Delay_Resp message at a first slave device. The time synchronization system can also complete time correction and initiate the propagation delay measurement period between the first slave device 300 and the second slave device 400 on the basis of the corrected time at an earlier timing, in comparison to a time synchronization system in which time correction is not started from the timing of completion of reception of a Delay_Resp message at a first slave device. The time synchronization system can therefore shorten the period in which the second slave device 400 has a time error relative to the master device 200.

Although the first slave device 300 preferably starts time correction from the timing of completion of reception of the Delay_Resp message as in this embodiment, this configuration may be modified provided that the first slave device 300 does not execute time correction during the propagation delay measurement period between the first slave device 300 and the second slave device 400. For example, the first time corrector 320 may start time correction after elapse of a predetermined duration since completion of reception of the Delay_Resp message by the first response information receiver 312.

In the time synchronization system 100 according to this embodiment, the second time corrector 420 starts time correction from the timing of completion of reception of the Delay_Resp message by the second response information receiver 412.

This time synchronization system can shorten the period in which the second slave device 400 has a time error relative to the master device 200, in comparison to a time synchronization system in which time correction is not started from the timing of completion of reception of a Delay_Resp message at a second slave device. The time synchronization system can also facilitate time correction to be completed before reception of a new Sync message at the second slave device 400 from the first slave device 300, in comparison to a time synchronization system in which time correction is not started from the timing of completion of reception of the Delay_Resp message at a second slave device. The time synchronization system can also complete time correction at an earlier timing in comparison to a time synchronization system in which time correction is not started from the timing of completion of reception of a Delay_Resp message at a second slave device, and, in the case where the third slave device is connected to the second slave device 400, can initiate the propagation delay measurement period between the second slave device 400 and the third slave device on the basis of the corrected time. The time synchronization system can therefore shorten the period in which the third slave device has a time error relative to the master device 200.

Although the second slave device 400 preferably starts time correction from the timing of completion of reception of the Delay_Resp message as in this embodiment, this configuration may be modified provided that the second slave device 400 does not execute time correction during the propagation delay measurement period between the second slave device 400 and the third slave device. For example, the second time corrector 420 may start time correction after elapse of a predetermined duration since completion of reception of the Delay_Resp message by the second response information receiver 412.

Although the second slave device 400 preferably starts transmission of the Sync message to the third slave device from the timing of completion of time correction as in this embodiment in the case where the third slave device is connected to the second slave device 400, this configuration may be modified provided that the second slave device 400 does not execute time correction during the propagation delay measurement period between the second slave device 400 and the third slave device. For example, the second synchronization information transmitter 432 may start transmission of the Sync message to the third slave device after elapse of a predetermined duration since completion of time correction by the second time corrector 420.

Although synchronization information is transmitted by a so-called two-step procedure involving transmitting a Sync message and then transmitting a Follow_Up message from which the first time T1 indicating the time of transmission of the Sync message can be identified in this embodiment, this configuration is a mere example. For example, synchronization information may be transmitted by a so-called one-step procedure involving transmitting a Sync message from which the first time T1 indicating the time of transmission of the Sync message can be identified without transmitting a Follow_Up message.

Although the first slave device 300, which is an example of a time synchronization device, is connected to the master device 200 in this embodiment, the destination to which the first slave device 300 is connected is not necessarily the master device 200 provided that the destination is a time retaining device. For example, the first slave device 300 may also be connected to a higher-order slave device, which is an example of a time retaining device. The higher-order slave device means a slave device leading to the grandmaster via a smaller number of boundary clocks than that of the first slave device 300. The higher-order slave device is thus required to be a computer serving as a boundary clock in the PTP, for example, like the first slave device 300 and the second slave device 400. That is, the time retaining device is not necessarily the master device 200 serving as the grandmaster and may also be a higher-order slave device serving as a boundary clock. In the case where the first slave device 300 is connected to a higher-order slave device, the time synchronization system can also bring about the actions and effects of the present disclosure, provided that the higher-order slave device does not execute time correction during a propagation delay measurement period between the higher-order slave device and the first slave device 300, like the first slave device 300.

Although the master device 200, the first slave device 300, the second slave device 400, the third slave device, and the like are connected in the form of linear connection to configure the LAN in this embodiment, the LAN may also have another form. For example, the master device 200 and multiple slave devices including the first slave device 300 and the second slave device 400 may be connected in the form of ring connection. Alternatively, multiple slave devices may be connected in the form of tree connection to the master device 200 serving as the root, for example. Alternatively, the master device 200 and multiple slave devices may be connected to a single bus line in the form of bus connection, or to a single hub in the form of star connection, for example. Alternatively, the master device 200 and multiple slave devices may be connected to each other in the form of mesh connection, for example. In any of these cases, the time synchronization system can also bring about the actions and effects of the present disclosure, by causing a slave device directly connected to the master device 200 to serve as the first slave device 300 and causing a slave device directly connected to the first slave device 300 without being directly connected to the master device 200 to serve as the second slave device 400.

The central part of execution of the processes at each of the first slave device 300 and the second slave device 400, which includes the controller 51, the main storage 52, the external storage 53, the transmitter/receiver 54, and the internal bus 50 may be achieved by an ordinary computer system without a dedicated system. For example, a computer program for performing the above functions may be stored in a non-transitory computer-readable recording medium, such as flexible disk or DVD-read-only-memory (ROM) for distribution, and may be installed in a computer to configure each of the first slave device 300 and the second slave device 400 that execute the above processes. Alternatively, this computer program may be stored in a storage device included in a server on a communication network, such as the Internet, and may be downloaded into an ordinary computer system to configure each of the first slave device 300 and the second slave device 400.

In the case where the functions of the first slave device 300 and the second slave device 400 are achieved by sharing of an operating system (OS) and an application program or by cooperation of the OS and the application program, only the application program may be stored in a non-transitory recording medium or a storage device.

The computer program may be provided via a communication network while being superimposed on a carrier wave. For example, the computer program may be posted on a bulletin board system (BBS) on a communication network and may be provided via the network. A computer may activate this computer program and execute the computer program under the control of the OS in the same manner as the other application programs, and thereby execute the above processes.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

50 Internal bus
51 Controller
52 Main storage
53 External storage
54 Transmitter/receiver
59 Control program
100 Time synchronization system
200 Master device
201, 302, 402 Master port
300 First slave device
301, 401 Slave port
310 First time information receiver
311 First synchronization information receiver
312 First response information receiver
313 First request information receiver
320 First time corrector
330 First time information transmitter
331 First request information transmitter
332 First synchronization information transmitter
333 First response information transmitter
400 Second slave device
410 Second time information receiver
411 Second synchronization information receiver
412 Second response information receiver
413 Second request information receiver
420 Second time corrector
430 Second time information transmitter
431 Second request information transmitter
432 Second synchronization information transmitter
433 Second response information transmitter

The invention claimed is:

1. A time synchronization device connectable to a time retaining device retaining a time to execute time synchronization with the time retaining device, together with another time synchronization device not connected to the time retaining device, the time synchronization device comprising:
    a synchronization information transmitter to transmit synchronization information on time synchronization to the another time synchronization device;

a request information receiver to receive request information that is based on the synchronization information, the request information being transmitted from the another time synchronization device after transmission of the synchronization information from the synchronization information transmitter;

a response information transmitter to transmit, to the another time synchronization device, response information responding to the request information received by the request information receiver; and a time corrector (i) to execute time correction based on a propagation delay time between the time retaining device and the time synchronization device during a period different from a predetermined period from transmission of the synchronization information from the synchronization information transmitter until reception of the request information by the request information receiver, the propagation delay time being calculated from times identified through transmission and reception of information to and from the time retaining device, and (ii) not to execute time correction during the predetermined period even when information is received from or transmitted to the time retaining device.

2. The time synchronization device according to claim 1, further comprising:

a synchronization information receiver to receive synchronization information transmitted from the time retaining device;

a request information transmitter to transmit, to the time retaining device, request information that is based on the synchronization information received by the synchronization information receiver; and a response information receiver to receive response information transmitted from the time retaining device having received the request information, wherein, when the response information receiver receives the response information during the predetermined period, the time corrector starts time correction after completion of reception of the request information by the request information receiver.

3. The time synchronization device according to claim 2, wherein the synchronization information transmitter starts transmission of the synchronization information from a timing of completion of time correction by the time corrector.

4. The time synchronization device according to claim 1, wherein the synchronization information transmitter starts transmission of the synchronization information from a timing of completion of time correction by the time corrector.

5. The time synchronization device according to claim 1, wherein the time corrector performs the time correction before the synchronization information transmitter transmits the synchronization information on the time synchronization to the another time synchronization device.

6. A time synchronization system, comprising:
a time retaining device to retain a time;
a first time synchronization device connected to the time retaining device; and
a second time synchronization device connected to the first time synchronization device, wherein
the first time synchronization device and the second time synchronization device execute time synchronization with the time retaining device, the first time synchronization device comprises:

a first synchronization information receiver to receive synchronization information on time synchronization transmitted from the time retaining device;

a first request information transmitter to transmit, to the time retaining device, request information that is based on the synchronization information received by the first synchronization information receiver;

a first response information receiver to receive response information transmitted from the time retaining device having received the request information;

a first time corrector to execute time correction based on a propagation delay time between the time retaining device and the first time synchronization device, the propagation delay time being calculated from times identified through transmission and reception of information to and from the time retaining device via the first synchronization information receiver, the first request information transmitter, and the first response information receiver;

a first synchronization information transmitter to transmit synchronization information to the second time synchronization device;

a first request information receiver to receive request information, the request information being transmitted from the second time synchronization device after transmission of the synchronization information from the first synchronization information transmitter; and a first response information transmitter to transmit, to the second time synchronization device, response information responding to the request information received by the first request information receiver, the second time synchronization device comprises:

a second synchronization information receiver to receive the synchronization information transmitted from the first synchronization information transmitter;

a second request information transmitter to transmit, to the first time synchronization device, the request information that is based on the synchronization information received by the second synchronization information receiver;

a second response information receiver to receive the response information transmitted from the first response information transmitter; and a second time corrector to execute time correction based on a propagation delay time between the first time synchronization device and the second time synchronization device, the propagation delay time being calculated from times identified through transmission and reception of information to and from the first time synchronization device via the second synchronization information receiver, the second request information transmitter, and the second response information receiver, and the first time synchronization device does not execute time correction during a predetermined period from transmission of the synchronization information from the first synchronization information transmitter until reception of the request information by the first request information receiver even when information is received from or transmitted to the time retaining device.

7. The time synchronization system according to claim 6, wherein the second time corrector starts time correction from a timing of completion of reception of the response information by the second response information receiver.

8. The time system according to claim 6, wherein the first time corrector performs the time correction after the first response information receiver receives the response information transmitted from the time retaining device.

9. The time system according to claim 8, wherein the second time corrector performs the time correction after the second response information receiver receives the response information transmitted from the first response information transmitter.

10. The time system according to claim 6, wherein the first time corrector performs the time correction before the first synchronization information transmitter transmits the synchronization information to the second time synchronization device.

11. The time system according to claim 10, wherein the first time corrector performs the time correction before the first synchronization information transmitter transmits the synchronization information to the second time synchronization device.

12. The time system according to claim 11, wherein the second time corrector performs the time correction after the second response information receiver receives the response information transmitted from the first response information transmitter.

13. The time system according to claim 10, wherein the second time corrector performs the time correction after the second response information receiver receives the response information transmitted from the first response information transmitter.

14. The time system according to claim 6, wherein the second time corrector performs the time correction after the second response information receiver receives the response information transmitted from the first response information transmitter.

15. A non-transitory computer-readable recording medium storing a program, the program causing a computer to function as:
- a synchronization information transmitter to transmit synchronization information on time synchronization to another time synchronization device, the another time synchronization device being not connected to a time retaining device retaining a time, the another time synchronization device being configured to execute time synchronization with the time retaining device;
- a request information receiver to receive request information that is based on the synchronization information, the request information being transmitted from the another time synchronization device after transmission of the synchronization information from the synchronization information transmitter;
- a response information transmitter to transmit, to the another time synchronization device, response information responding to the request information received by the request information receiver; and
- a time corrector (i) to execute time correction based on a propagation delay time between the time retaining device and the computer during a period different from a predetermined period from transmission of the synchronization information from the synchronization information transmitter until reception of the request information by the request information receiver, the propagation delay time being calculated from times identified through transmission and reception of information to and from the time retaining device, and (ii) not to execute time correction during the predetermined period even when information is received from or transmitted to the time retaining device.

16. The non-transitory computer-readable recording medium according to claim 15, wherein the time corrector performs the time correction before the synchronization information transmitter transmits the synchronization information on the time synchronization to the another time synchronization device.

* * * * *